United States Patent
Kim

(10) Patent No.: US 7,124,945 B2
(45) Date of Patent: Oct. 24, 2006

(54) READING UNIT AND MARKING CARD FOR OPTICAL MARK READER

(75) Inventor: Taek-Jin Kim, Daegu (KR)

(73) Assignee: Easy Test Co., Ltd., Gyeungsangbuk-do (KR)

(*) Notice: Subject to any disclaimer, the term of this patent is extended or adjusted under 35 U.S.C. 154(b) by 0 days.

(21) Appl. No.: 10/485,199

(22) PCT Filed: Jul. 26, 2002

(86) PCT No.: PCT/KR02/01405

§ 371 (c)(1),
(2), (4) Date: Aug. 16, 2004

(87) PCT Pub. No.: WO03/010704

PCT Pub. Date: Feb. 6, 2003

(65) Prior Publication Data

US 2005/0001032 A1    Jan. 6, 2005

(30) Foreign Application Priority Data

Jul. 26, 2001    (KR) ................................ 2001-45035

(51) Int. Cl.
*G06K 7/10* (2006.01)
*G06K 7/14* (2006.01)

(52) U.S. Cl. .............. 235/454; 235/456; 235/462.19
(58) Field of Classification Search ................ 235/454, 235/436, 494, 456, 462.09, 462.11, 462.16, 235/462.18, 462.19; 434/363
See application file for complete search history.

(56) References Cited

U.S. PATENT DOCUMENTS

| | | | | |
|---|---|---|---|---|
| 3,579,868 A | * | 5/1971 | Scott ........................ | 235/441 |
| 3,643,348 A | * | 2/1972 | Azure, Jr. ................. | 434/363 |
| 3,793,472 A | * | 2/1974 | Sternberg et al. .......... | 434/363 |
| 3,860,790 A | * | 1/1975 | Reckdahl .................... | 235/487 |
| 4,153,895 A | * | 5/1979 | Weisbrod et al. .......... | 235/456 |
| 4,571,699 A | * | 2/1986 | Herzog et al. ............. | 358/408 |
| 4,943,239 A | * | 7/1990 | Koslin ........................ | 434/363 |
| 5,001,330 A | * | 3/1991 | Koch .......................... | 235/436 |
| 5,272,352 A | * | 12/1993 | Maetani et al. ......... | 250/559.02 |
| 5,420,407 A | * | 5/1995 | Grundy, Jr. ................ | 235/454 |
| 5,691,527 A | * | 11/1997 | Hara et al. ................. | 235/456 |
| 5,898,166 A | * | 4/1999 | Fukuda et al. ............. | 235/494 |
| 6,079,624 A | * | 6/2000 | Apperson et al. ........ | 235/494 |
| 6,364,209 B1 | * | 4/2002 | Tatsuta et al. ............. | 235/494 |

* cited by examiner

*Primary Examiner*—Uyen-Chau N. Le
(74) *Attorney, Agent, or Firm*—Blakely, Sokoloff, Taylor & Zafman; Stephen M. De Klerk

(57) ABSTRACT

The present invention relates to a reading unit and a marking card for optical mark reader.

The reading unit comprises a plurality of optical sensing devices (R1, R2, R3, R4 . . . ) corresponding to a plurality of marks (M1, M2, M3, M4 . . . ); and a plurality of counters (CT1, CT2, CT3, CT4 . . . ) for converting output signals to output values corresponding to an amount of light sensed, and for sending the output values to a central processing unit (CPU).

The CPU performs an answer checking process by a logical calculation based on the output values from the counters (CT1, CT2, CT3, CT4 . . . ).

2 Claims, 5 Drawing Sheets

READING UNIT AND MARKING CARD FOR OPTICAL MARK READER

CROSS-REFERENCE TO OTHER APPLICATIONS

This Application is a National Phase of International Application No. PCT/KR02/01405, filed on Jul. 26, 2002, which claims priority from Korean Patent Application No. 2001/45035, filed on Jul. 26, 2001.

TECHNICAL FIELD

The present invention relates to a reading unit and marking card for optical mark reader, and more particularly to a marking card having a plurality of marking areas for each of answering marks for each question and a reading unit reading thereof.

DESCRIPTION OF THE RELATED ART

Optical mark reader and marking cards used for optical mark reader (OMR) etc. are widely used as answer sheets of examinations applied/participated by large number of examinees or as input of statistical analysis data.

Such use is due to cheap cost per card and their easy distribution and collection, which is useful in processing large amount of data. Particularly, such cards are in popular use for various kinds of examinations to which hundreds of thousands of student candidates apply as the most effective data process medium.

Such optical mark reader has a structure of arranging either discharging optical transmission device and optical reception device to portions marked by examination candidates on the marking card and detecting value of the amount of the passed light through card or reflected light with various kinds of optical sensor to read answer numbers from the central processing unit within the reader.

Such conventional optical mark reader has problems as explained below since its central processing unit is very expensive but does not have good efficiency.

First, in case of reading an examination question wherein one answer should be selected from the four answers by optical mark reader and marking card, the examinee marks the answer (for example, answer choice number one, answer choice number two, or answer choice number three, etc.) pertinent to each question with pen, etc. on the corresponding marks. Then, the reading unit for the conventional optical mark reader amplifies electrical signals output from card by OP amplifier, and searches the final/ultimate answer by using AND gate.

However, correcting the first marked answer choice number was impossible in the conventional art.

A method of recognizing the newly marked answer as the final answer when marking the new answer choice darker or bigger than the originally marked answer was contrived as a solution to this problem. With regard to such method, the Applicant of the present invention has filed a patent application on Dec. 2, 1988 which was registered as Patent Registration Publication No. 1992-10480 on Nov. 28, 1992. FIG. 1 illustrates such invention.

FIG. 1 is an exemplary explanative diagram of the reading unit for the conventional optical mark reader. In reference to FIG. 1, a reading device having optical detection unit (U) is disclosed. Even if a plurality of answers for a question was marked on the marking card (C), the device reads the biggest value among the plurality of marked answers, and ultimately transmits digital data value of a single answer by the central processing unit of the computer. The optical detection unit (U) lets the central processing unit check the correct/incorrect answer.

Nevertheless, in case of the above invention, such reading is performed in a hardware structure. Therefore, for cases that select an answer from five, six choices, etc. but not from four choices, problems such as the circuit structure becoming very complex and a sharp rise in the price of the reading unit arise.

Furthermore, such method raises a problem of low credibility in checking correct/incorrect answers by setting the amount of light rendered from the marked answers as an only criterion to determine correct answer from the plurality of the marked answers.

Secondly, the conventional art cannot provide a structure of a plurality of answers such as two answers selected from six choices, three answers selected from five choices, etc. Accordingly, the conventional art has a problem in which its applicable subject matters for optical mark reader are limited.

SUMMARY OF THE INVENTION

The present invention tries to resolve the aforementioned conventional problems and its object is to provide a reading unit for an optical mark reader that recognizes correction or re-correction of the answers made by examinees more effectively and accurately.

The other object of the present invention is to save cost by simplifying the hardware circuit structure of the reading unit in checking the correct/incorrect answers for multiple-choice type, and to provide a reading unit for the optical mark reader applicable to various types of answer.

In order to achieve the object of the invention, the present invention provides a reading unit that checks the correct answer by programmatically processing a logical calculation based on predetermined number of values selected according to an order of magnitude thereof among the data input by the central processing unit (CPU) of the optical process reader, etc. thereof.

Also, in order to achieve the other object of the present invention, the present invention furnishes a marking card read by an optical mark reader, wherein a plurality of marking areas is formed in each of a plurality of answering marks for a question in the card.

Moreover, in order to achieve another object of the present invention, the present invention provides a reading unit (U) for an optical mark reader, which reads a marking card formed with a plurality of marks (M1, M2, M3, M4 . . . ) in each of a plurality of answering marks for a question, the reading unit comprising a plurality of optical sensing devices (R1, R2, R3, R4 . . . ) corresponding to the plurality of marks (M1, M2, M3, M4 . . . ), and responding to a transmitted or reflected marks (M1, M2, M3, M4 . . . ); and a plurality of counters (CT1, CT2, CT3, CT4 . . . ) for converting output signals from the optical sensing devices (R1, R2, R3, R4 . . . ) to an output values corresponding to an amount of light sensed by the optical sensing devices, and send the output values to a CPU; wherein the CPU performs an answer checking process by a logical calculation based on the output values from the counters (CT1, CT2, CT3, CT4 . . . ).

EMBODIMENTS

In reference to the attached drawings, the preferred embodiments of the present invention are described herein below in details.

Figure 2:
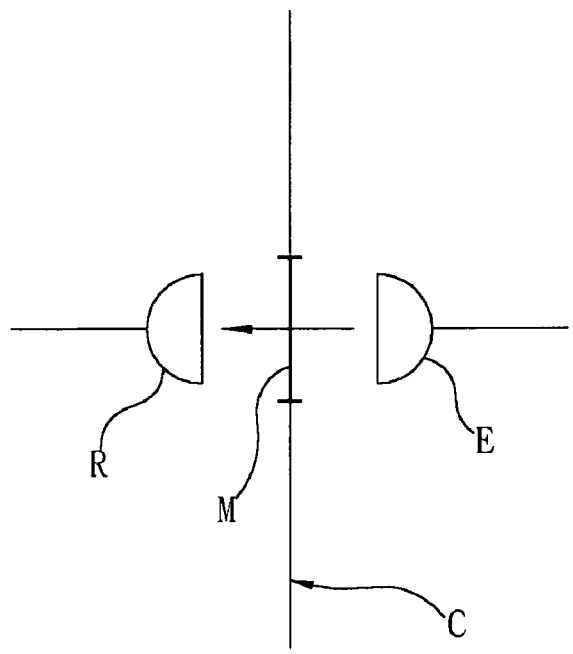
FIG. 2 is an explanative diagram explaining the principle of reading of the reading unit for the general optical mark reader.
Figure 2:
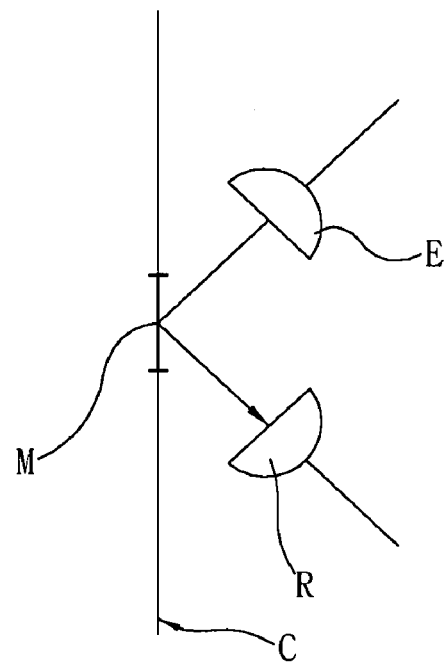

FIG. 2 is an explanative diagram explaining the principle of reading of the reading unit for the ordinary optical mark reader. The sensor performing reading function generally uses two types of sensors; a transmitting type and a reflecting type.

Referring to FIG. 2, a light irradiation device (E) irradiates light to marks (M) marked on the marking card (C) by marking means such as computer readable marking pens, etc. Then, a light sensing device (R) senses the light transmitted through or reflected from the mark (M) and performs reading by generating output signals.

At this time, different electrical signals appear according to the extent of how much the markings are done on the marking card (C). Conventionally, output values of such light sensing device (R) are digitally processed. As in value of 1 and 0, the output values are transmitted to the central processing unit (CPU).

Figure 1:
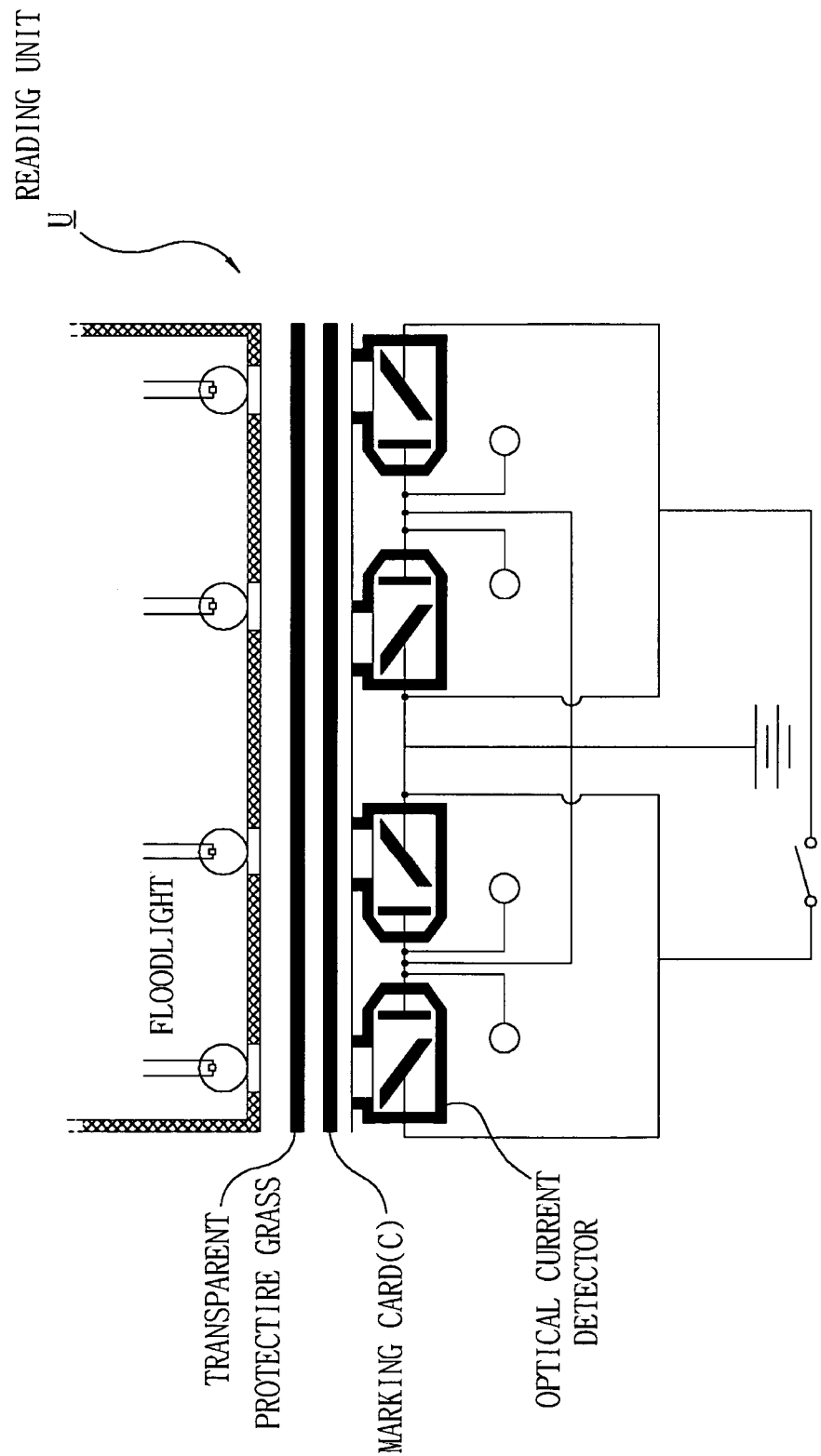
FIG. 1 is an exemplary explanative diagram of the reading unit for the conventional optical mark reader.

As aforementioned, conventionally in order to detect the biggest value as the correct answer regarding the answers of the multiple-choice type questions, various devices such as those of FIG. 1 are used, which has problems of the aforementioned inaccuracy in checking the correct answers and an expensive cost of the apparatus.

Figure 3:
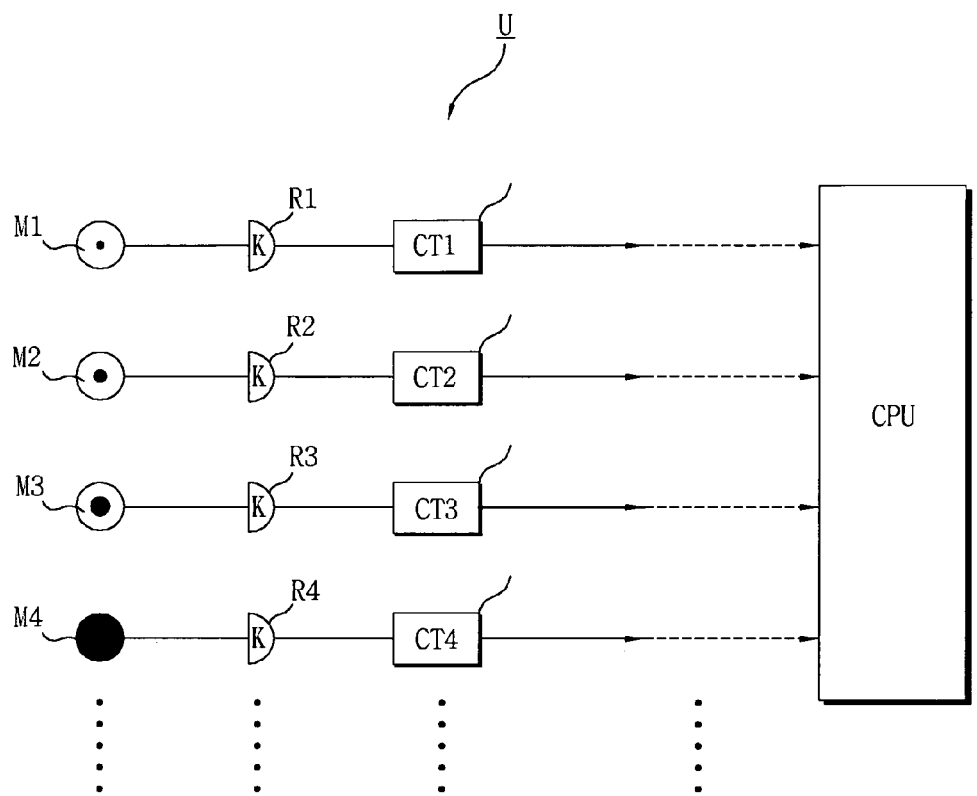
FIG. 3 is a schematic diagram of the reading unit for the optical mark reader according to the present invention.

FIG. 3 is a schematic diagram of the reading unit for the optical mark reader according to the present invention. In reference to FIG. 3, the reading unit (U) of the present invention comprises a plurality of optical sensing devices (R1, R2, R3, R4 . . . ) sensing signals corresponding to the plurality of marks (M1, M2, M3, M4 . . . ) formed in each of a plurality of answering marks for a question on a marking card (C), and a plurality of counters (CT1, CT2, CT3, CT4 . . . ) for converting output signals from the optical sensing devices to an output values corresponding/in proportionate to an amount of light sensed by the optical sensing devices.

Each mark (M1, M2, M3, M4 . . . ) has different amount of markings (that is, marking areas). Accordingly, the counters (CT1, CT2, CT3, CT4 . . . ) digitize the electrical signals to different values according to each amount of markings. Thus, the output signals from each light sensing device (R1, R2, R3, R4 . . . ) in the reading unit for the optical mark reader of the present invention are counted from the counters (CT1, CT2, CT3, CT4 . . . ), and such counted pulse values are transmitted to the central processing unit (CPU) to be used as reading data.

The reading unit (U) for the optical mark reader of the present invention having the aforementioned constitution outputs different numbers of pulses according to the size and darkness of the marks (M1, M2, M3, M4 . . . ) marked by users, and transmits each of such output values to the central processing unit (CPU) independently.

The central processing unit (CPU) takes either the biggest value among data inputted as various programming or takes two or three values, and checks the correct/incorrect answers by also programmatically processing a logical calculation (for example, a program selecting two or three values according to an order of the biggest magnitude among the output values marked for a question).

Such selection is possible because a comparative calculation of the output values counted from each of the optical sensing devices (R1, R2, R3, R4 . . . ) or a comparative calculation of establishing a basis value and comparing such basis value with other values.

Hence, a reading device equipped with the reading unit (U) for the optical mark reader of the present invention has an advantage of preparing question sheets in various ways such as increasing choices of answers according to a question or selecting a plurality of answers. The logical calculation for grading, etc. is an ordinary program; therefore, description thereof is omitted.

Figure 4:
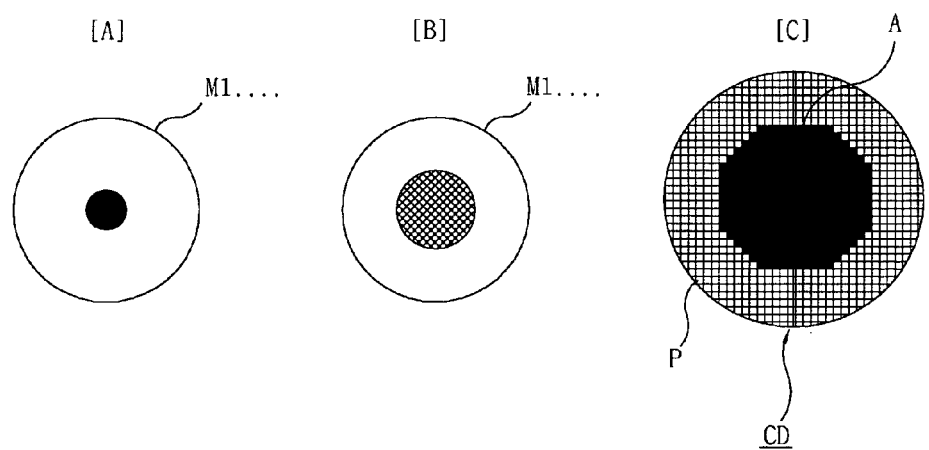
FIG. 4 is an explanative diagram explaining other embodiment of the reading of the reading unit for the optical mark reader of the present invention.

FIG. 4 is an explanative diagram explaining other embodiment of the reading of the reading unit for the optical mark reader of the present invention.

As a preferable light sensing device (R1, R2, R3, R4 . . . ) used in the aforementioned reading unit (U) of the optical mark reader of the present invention, a CCD device (CD) illustrated in FIG. 4C can be used. The CCD device is a charge coupled device which is an image processing device having numerous photo cells formed as pixel that recognizes the area.

The reasons for the appropriateness of a CCD device (CD) to be used for the reading unit (U) for the optical mark reader of the present invention are as follows:

When simultaneously sensing markings of a question, the examinee marks/indicates the marks (M1, M2, M3, M4 . . . ) in a darkly shaded small circle as can be seen in FIG. 4A and sensing markings that are [lightly shaded] but shaded in a wide area as can be seen in FIG. 4B, the amount of light transmitted is the same. Thus, the sensing signals also become the same, which may cause a situation of extreme difficulty in reading.

Particularly, the method of multiple-choice type and correction of markings that will be explained later, etc. which are the advantages of the reading unit for the optical mark reader of the present invention does not provide user with a wide range of permitted limit of markings. In this regard, an erroneous reading may occur.

Accordingly, as can be seen in FIG. 4C, if a CCD device (CD) is used, each photo pixel (p) of CCD device (CD) will output values of 1 and 0 regardless of density of light transmitted through the marking card (C). Thus, as the output values of the entire CCD device (CD) are determined only by size of area (A) of the marked marks, the output values can be read at the central processing unit (CPU) regardless of the density of the aforementioned marking marks (M1, M2, M3, M4, M5 . . . ). Hence, a problem generated by a difference in the density of the aforementioned markings can be solved with the use of a CCD device as the light sensing device.

Furthermore, other than a CCD device (CD), a recently developed CMOS image process device, etc. which performs the identical function can be preferably used.

Figure 5:
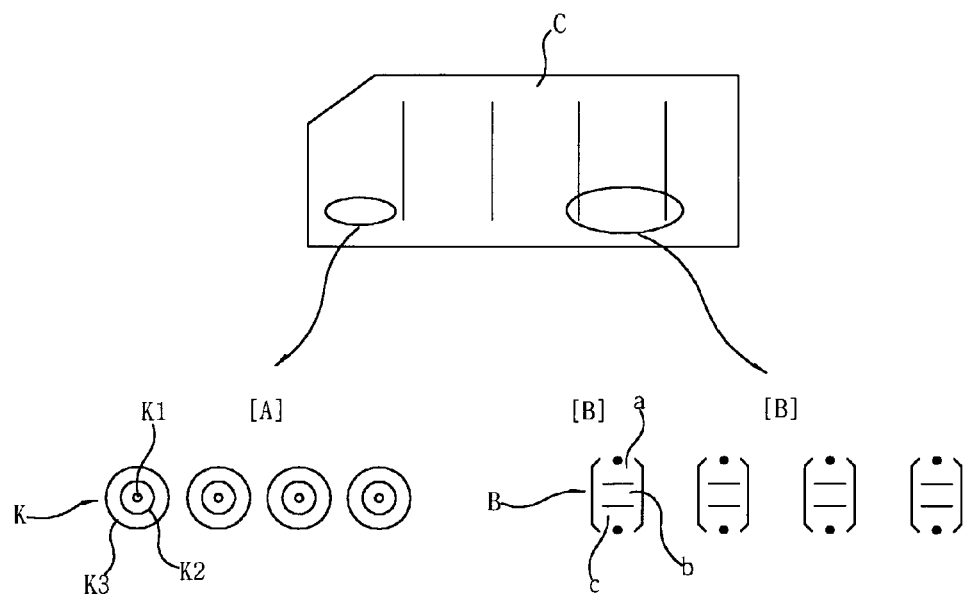
FIG. 5 is a diagram illustrating schematically the marking card used in the reading unit for the optical mark reader of the present invention.

FIGS. 5 A & B schematically illustrate the marking card (C) appropriate for the reading unit of the optical mark reader of the present invention.

FIG. 5 A depicts a marking circle section (K) of the marking card (C) structured with multiple of circles such as arrow targets. In such case, if the first original answer was marked in a first circle (K1) at the center, and later a different answer was discovered as a result of verification, the examinee can indicate the other different later answer extendedly to a second circle (K2) of its own marks. The central processing unit (CPU) determines such correction of the first original answer to the later answer by calculation program. Also, when it is determined that the first original answer is right after the correction, the mark of the first original answer is shaded extendedly to a third circle (K3), which has been initially shaded only to the extent of the first circle (K1).

In similar manner, FIG. 5 B portrays a case using a rectangular marking box section (B). As the box section is divided into three equal correction areas (a, b, c) to be marked respectively, the same aforementioned correction and re-correction can be made. Thus, the examinee can correct/change his/her answers and reduce his/her mental burden due to not permitting the error correction.

Such flexible readability is possible due to the central processing unit (CPU)'s independent receipt of output values of the light sensing device (R1, R2, R3, R4 . . . ) in the reading unit for the optical mark reader of the present invention and reading of answers by logical calculation.

Namely, in comparison to the conventional method of searching for correct answers based on the size of the marked amount, the present invention not only can easily determine output values from recognizing the size of marks from the counters (CT1, CT2, CT3, CT4 . . . ) as it can recognize the extent of markings made upto certain marks, but also without comparing the output values, can easily recognize the order of priority of the answers simply based only on the recognition of whether marks (M1, M2, M3, M4 . . . ) have been indicated. Accordingly, processing answer sheet of multiple-choice type and the corrected answer sheet became easier, which enabled the reduction of complexity in calculating the logical calculation of the data.

Figure 6:
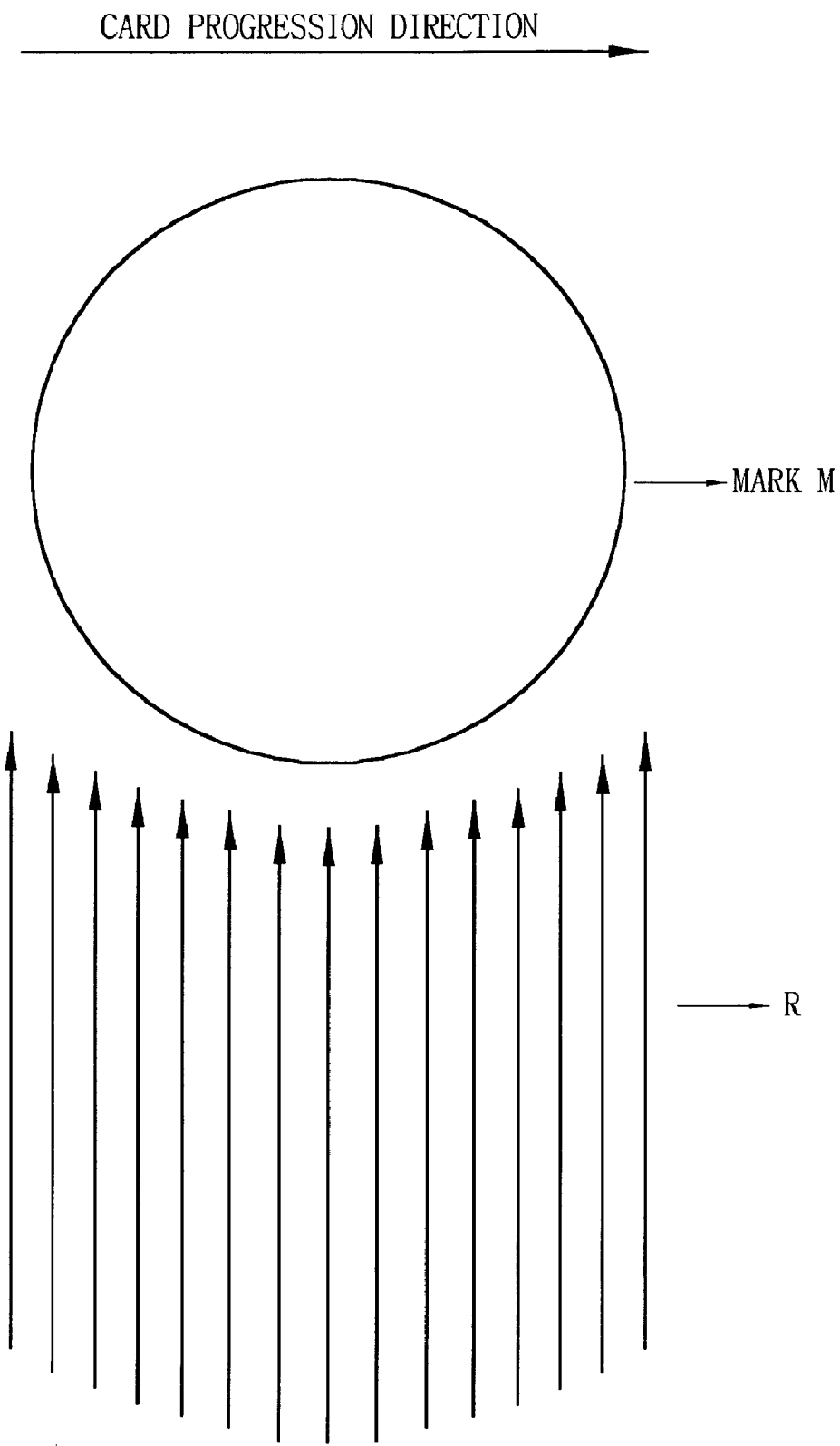
FIG. 6 is a diagram representing other embodiment sensing the marked amount of the marks.

FIG. 6 is a diagram representing other embodiment sensing the marked amount of the marks.

Conventionally, the amount transmitted in the marks was measured by giving signals to the marks once. However, the present invention sends signals several times as the card proceeds along the progression direction so that it can calculate the transmitted amount by calculating the number of times the signals are checked to be '1'. That is, when selecting a plurality of answers, the method calculating the marked amount by measuring the amount transmitted or reflected with giving signals once compares each of the output values of such marked amount. Such method provides an easier method to measure the amount transmitted or reflected since it compares the number of times regarding whether it sensed or not by the signals sent several times.

For example, if signals are sent to a mark (M) ten times and '1' is sensed three times, such mark is determined to be marked 3/10 degree. Accordingly, when checking a plurality of answers among several marks, the sensed number of times is compared and the answer is determined in the order of the biggest number of times.

Moreover, such embodiment can be effectively used for a case in which the size of markings in the plurality of marks (M1, M2, M3, M4 . . . ) is ambiguous; for example, when it is ambiguous whether markings were made upto M4 or M3. That is, when the light sensing device (R4) sensing mark (M4) detects three times from the transmission of ten times, it is deemed that the mark is not made in mark (M4).

Also, the present invention processes the output signals by logical calculation program from the conventional hardware structure, which can simplify the whole structure without making hardware complex even regarding the structure of the complex answer sheet of multiple-choice type.

That is, the conventional hardware structure makes the electrical signals coming out from R in FIG. 2 to be expressed as 0 or 1, establishes a predetermined basis value, and outputs 1 or 0 when the signals are more than or less than the basis value. Such basis value can be adjusted by the user so that the degree of preventing erroneous reading is inadequate, and ultimately, correction by double markings is impossible.

The present invention measures the value of R from the counter (AD converter, etc.) without passing through the basis value as can be seen in FIG. 3, and sends such measured value to the central processing unit (CPU). The desired answer is selected from the central processing unit (CPU) by calculating large or small of such value.

In case of the conventional OMR card reading device, the aforementioned reading and processing portion is constituted in a hardware. Thus, for cases of various types of answer sheets (for example, cases of selecting one answer from 4 choices and 5 choices and selecting two answers from 5 choices, etc.), such cases entail a necessity of exchanging each hardware. As for cases of mixed combination of each question having one answer from five choices and two answers from five choices, the application thereof is very difficult. Yet, if it is realized by software, the portion converting values of R from the hardware structure to the counter (AD converter, etc.) is added, and the portion establishing a base value is not needed any more.

In the method for transferring the value of 0 or 1 which passed through the pre-existing base value via the central processing unit (CPU), etc., the present invention inputs various values, i.e. values from 0 into the central processing unit (CPU) and comparatively calculates these values to determine whether the corresponding number is 0 or 1. Also, the method for selecting answers can be made into a program, which will simplify the structure of the hardware.

The reading unit and marking card for the optical mark reader of the present invention disclose only the reading means/methods. The method for programmatically processing in the central processing unit (CPU) is possible by programming a simple logic calculation of comparison and correspondence. Thus, description of such method is omitted.

INDUSTRIAL APPLICABLITY

The aforementioned reading unit and marking card for optical mark reader of the present invention furnish examinees with more effective and accurate recognition of the correction or re-correction of answers, and in checking correct answers of multiple-choice type answer sheet, they reduce cost by simplifying hardware circuit structure of the reading unit. They also provide more various types of answer sheet. Moreover, compared to the prior art, they are accurate in reading and have capacity to extend applicable subjects as they read by software.

What is claimed is:

1. A reading unit for an optical mark reader, the reading unit comprising:

an optical sensing device for sensing the light which is transmitted through or reflected from an answering mark, the answering mark divided into a plurality of predefined areas;

a counter for counting a number of times that a marked area of the divided answering mark is sensed, based on an output signal from the optical sensing device; and a CPU for determining a size of the marked area based on the number counted by the counter and in accordance with the predefined areas, and checks a correct answer based on a determined size.

2. The reading unit for an optical mark reader according to claim 1, wherein said optical sensing device is an image sensing device including either of a CCD device (CD) or a CMOS device having a plurality of photo cells for performing a binary process.

* * * * *